United States Patent
Weigers et al.

[11] Patent Number: 5,856,820
[45] Date of Patent: Jan. 5, 1999

[54] LAMINATED ACOUSTIC WAVE TOUCH PANEL

[75] Inventors: David G. Weigers, Round Rock; Charles F. Bremigan, III, Jarrell, both of Tex.

[73] Assignee: The Whitaker Corporation, Wilmington, Del.

[21] Appl. No.: 826,207

[22] Filed: Mar. 27, 1997

Related U.S. Application Data

[63] Continuation-in-part of Ser. No. 393,760, Feb. 24, 1995, abandoned.

[51] Int. Cl.[6] .............................. G08C 21/00; G09G 5/00
[52] U.S. Cl. ....................... 345/177; 345/173; 178/18.04
[58] Field of Search ............................ 178/18.03, 18.04, 178/19.02, 19.04; 345/173, 177; 367/907

[56] References Cited

U.S. PATENT DOCUMENTS

| | | | |
|---|---|---|---|
| Re. 33,151 | 1/1990 | Adler | 340/712 |
| 3,673,327 | 6/1972 | Johnson et al. | 178/18 |
| 4,295,214 | 10/1981 | Thompson | 367/140 |
| 4,642,423 | 2/1987 | Adler | 178/18 |
| 4,644,100 | 2/1987 | Brenner et al. | 178/18 |
| 4,645,870 | 2/1987 | Adler | 178/19 |
| 4,700,176 | 10/1987 | Adler | 340/365 |
| 4,746,914 | 5/1988 | Adler | 340/712 |
| 4,791,416 | 12/1988 | Adler | 340/712 |
| 5,072,427 | 12/1991 | Knowles | 367/118 |
| 5,097,102 | 3/1992 | Yoshimura et al. | 178/18.04 |
| 5,243,148 | 9/1993 | Knowles | 178/18.04 |
| 5,329,070 | 7/1994 | Knowles | 178/18 |
| 5,451,723 | 9/1995 | Huang et al. | 345/177 |
| 5,484,967 | 1/1996 | Yanagisawa | 345/177 |
| 5,591,945 | 1/1997 | Kent | 178/19 |
| 5,648,643 | 7/1997 | Knowles et al. | 178/19 |

FOREIGN PATENT DOCUMENTS

| | | | |
|---|---|---|---|
| 0 364 983 A2 | 4/1990 | European Pat. Off. | G06K 11/14 |
| 0 435 203 A2 | 3/1991 | European Pat. Off. | G06K 11/14 |

*Primary Examiner*—Vijay Shankar
*Attorney, Agent, or Firm*—W. Francos

[57] ABSTRACT

A laminated acoustic wave touch panel is shown and a method of making the panel is described using an adhesive barrier material. The adhesive barrier material is positioned between a substrate in which a shear wave is to propagate and a backplate in order to form a cavity between the substrate and backplate. An adhesive is injected into the cavity to laminate the substrate to the back plate. The use of the barrier material allows the laminated touch panel to be easily manufactured and allows the adhesive to be constrained to a desired area of the panel. The invention envisions the use of similar and dissimilar materials for the substrate and backplate. The velocity of a shear wave at a given frequency is greater in the backplate than in the substrate in the case where the materials are dissimilar and equal for a given frequency when the materials are the same.

22 Claims, 1 Drawing Sheet

LAMINATED ACOUSTIC WAVE TOUCH PANEL

CONTINUING DATA

The present application is a continuation-in-part of U.S. patent Ser. No. 08/393,760 filed Feb. 24, 1995, now abandoned.

TECHNICAL FIELD

The present invention relates to an acoustic wave touch panel and more particularly to a laminated acoustic wave touch panel and method of making the panel including an adhesive barrier material positioned between a substrate in which a bulk acoustic wave propagates and a backplate wherein the barrier material defines a cavity into which the adhesive laminating the substrate to the backplate is injected.

BACKGROUND OF THE INVENTION

Acoustic wave touch panels are known to include a substrate on which transducers are mounted in order to impart an acoustic wave traveling along a first axis of the panel and along a second axis of the panel that is perpendicular to the first axis. An array of reflective elements extends along each of the first and second axes. Each array of reflective elements reflects portions of the acoustic wave imparted into the panel along a number of parallel paths of differing lengths such that these parallel paths extend across a touch region of the panel.

Some acoustic waves require that the thickness of the substrate be thin in order to support the particular acoustic wave desired for propagation while minimizing unwanted higher order modes of the acoustic wave. One such bulk acoustic wave is a zeroth order horizontally polarized shear wave referred to as Zohps.

In order to increase the thickness of the touch panel it is known to laminate the substrate in which the shear wave is propagating to a backplate using a non-shear wave coupling adhesive. A suitable adhesive used to bond the substrate to the backplate for a shear touch panel is a silicone rubber adhesive which remains liquid-like even after curing. In order to make such a laminated panel, heretofore the liquid-like adhesive was applied to either the back surface of the substrate or the top surface of the backplate. Next, one edge of the substrate was brought into contact with one edge of the backplate with the planes of the substrate and backplate at an angle to each other. The gap between the substrate and the backplate was then closed with the same motion that one would use to close a book, the substrate and backplate being brought together slowly so as to prevent air bubbles from forming in the adhesive layer. While the method disclosed above accomplishes the broad objective of limiting if not preventing coupling between substrate and the backplate, an improved technique, particularly for the purposes of manufacturing in large quantities is needed in the lamination process. Advantageously, as opposed to the above described technique in which the adhesive is not properly constrained to any limited area of the touch panel, an improved technique would constrain the adhesive material to a limited area of the touch panel.

SUMMARY OF THE INVENTION

In accordance with the present invention, the disadvantages of prior laminated acoustic wave touch panels have been overcome. The laminated acoustic wave touch panel of the present invention includes an adhesive barrier material defining a cavity into which the bonding adhesive may be injected. The adhesive barrier material allows the laminated panel to be easily manufactured and further constrains the adhesive to a desired area of the touch panel.

More particularly, the laminated acoustic wave touch panel of the present invention includes a substrate that is capable of supporting an acoustic wave such as a bulk acoustic wave for propagation therein. A backplate is provided so as to increase the overall thickness of the acoustic wave touch panel. An adhesive barrier material is positioned between the substrate and the backplate wherein the barrier material defines a cavity with at least three sides. The adhesive is injected into the cavity through the open side thereof between the substrate and the backplate to laminate the substrate to the backplate.

The adhesive barrier material may be positioned along the outer edges of the substrate and backplate. However, in a preferred embodiment wherein the acoustic wave touch panel includes a first array of reflective elements positioned adjacent a first edge of the touch panel and a second array of reflective elements adjacent a second perpendicular edge of the touch panel, the adhesive barrier material is disposed adjacent an inner edge of each of the acoustic arrays so that the barrier material defines a cavity that does not extend under an array of reflective elements. Because the adhesive material is constrained to an area that is not under the reflective element arrays, the arrays are not effected by acoustic wave losses due to laminating.

The adhesive material used to bond the substrate to the backplate or backing layer is preferably within a range depending on the application. To this end, in an application in which the substrate and backplate are similar if not identical from the standpoint of acoustic wave velocity, the preferred material for the adhesive is one which inhibits or prevents coupling of the shear wave from the substrate to the backplate. This is commonly referred to as a nonshear wave coupling adhesive. Such adhesives are as disclosed herein as well as in U.S. Pat. No. 5,243,148 to Knowles, the disclosure of which is specifically incorporated herein by reference. Of course, in the event that dissimilar materials are used for the substrate and backing layer or backplate, nonshear wave coupling adhesive may also be used. Another possibility is one in which the touch panel has a substrate in which a acoustic wave travels at a given velocity and a backplate in which an acoustic wave travels at a given velocity which is greater than the velocity of the acoustic wave and the substrate. In such an embodiment, the nature of the adhesive material plays a minor role in the prevention of coupling of an acoustic wave from the substrate to the backing layer. To this end, an acoustic wave traveling in the substrate will impinge upon the boundary of the substrate and the adhesive material interface intraversing the substrate. Analysis of the boundary conditions of the boundaries between the substrate/adhesive/backing layers show that in the event that the backing layer has physical properties in which the acoustic velocity is greater than the acoustic velocity in the substrate, that a condition analagous to optical total internal reflection is achieved. Accordingly, in the event that adhesive material enables the acoustic wave to traverse the adhesive material and be impingent upon the backing layer boundary, the acoustic wave will not couple to the backing layer in satisfying the boundary conditions. That is, the evanescent wave (determined from the wave equation in satisfying boundary conditions) is highly attenuated in the backing layer. Accordingly, the present invention envisions the adhesive lamination techniques described herein to be applicable to the cases in which the substrate and backing layer are similar if not identical from the standpoint of acoustic wave propagation as well as the case in which the substrate and backing plate have acoustic properties in which the velocity of the acoustic wave is greater in the backing layer than it is in the substrate. In the former case, a suitable nonshear wave coupling adhesive must be used as is described herein and in the above incorporated reference to Knowles. In the latter case, both the nonshear wave coupling adhesive as well as an adhesive which will enable a mechanical bond between the substrate and the backing layer is possible. To this end, an adhesive which will enable a mechanical bond (between the substrate and the backplate or backing layer) will enable a coupling of the acoustic wave in the substrate to the adhesive material. The backing layer, for the reasons stated above, will prevent the acoustic wave from coupling to the backing layer.

These and other objects, advantages and novel features of the present invention, as well as details of an illustrated embodiment thereof, will be more fully understood from the follow description and the drawing.

DESCRIPTION OF THE PREFERRED EMBODIMENT

Figure 1:
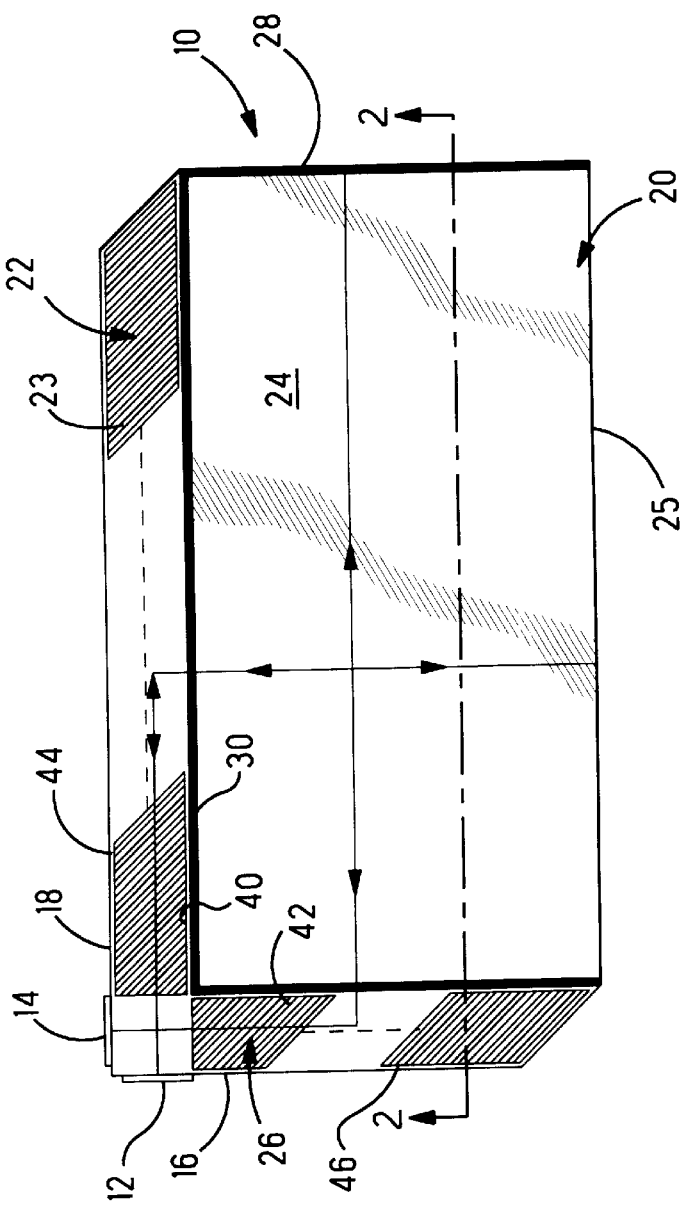
FIG. 1 is a top view of a laminated acoustic wave touch panel in accordance with the present invention.

A laminated acoustic wave touch panel 10 in accordance with the present invention, as shown in FIG. 1, includes a pair of transducers 12, 14 that are mounted on a respective edge 16, 18 of a touch panel substrate 20. The transducer 12 may be polarized to launch an acoustic wave, such as a zeroth order horizontally polarized shear wave, into the panel substrate 20 along a longitudinal axis of a reflective array 22. The reflective array 22 includes a large number of individual reflective elements 23 that are disposed along the length of the array 22 at an angle of 45° with respect to the longitudinal axis of the array. Each of the reflective elements 23 of the array 22 reflects a portion of the shear wave propagating along the array across a touch region 24 of the acoustic wave touch panel to a reflective edge 25 of the panel. The shear waves are reflected back to the array 22 by the reflective edge 25 of the panel substrate 20. The reflective array 22 in turn reflects the shear waves back to the transducer 12. The transducer 12 is coupled to circuitry, not shown, to detect a perturbation in the transducer signal indicating a touch on the touch region 24 of the acoustic wave touch panel 10. The operation of such an acoustic wave touch panel is described in detail in U.S. Pat. No. 5,329,070 assigned to the assignee of the present invention and incorporated herein by reference. Similarly, the transducer 14 launches a shear wave into the panel substrate 20 along a longitudinal axis of a reflective array 26. Each of the reflective elements of the reflective array 26 reflects a portion of the shear wave propagating along the array across the touch region 24 of the acoustic wave touch panel 10 to a reflective edge 28 of the panel. The shear waves are reflected back to the array 26 by the reflective edge 28 of the panel substrate 20. The reflective array 26 in turn reflects the shear waves back to the transducer 14 which is coupled to the circuitry to detect a perturbation in the transducer signal indicating a touch on the touch region 24 of the panel 10.

Figure 2:
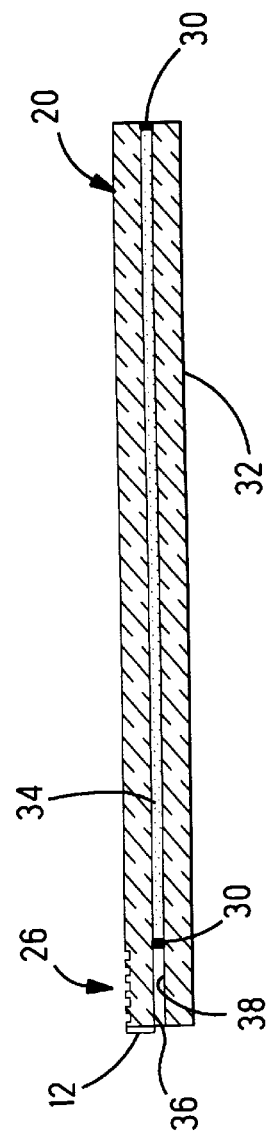
FIG. 2 is a cross-sectional view of the acoustic wave touch panel substrate shown in FIG. 1 taken along lines 2—2.

In order to increase the thickness of the touch panel 10 while still ensuring that the touch panel can support the desired acoustic waves such as the zeroth order horizontally polarized shear waves for propagation therein, the touch panel 10 is laminated to a backplate 32 as shown in FIG. 2. Preferably the thickness of the substrate 20 is less than two times the wavelength of the Zohps wave imparted into the substrate so as to avoid excessive higher order modes or overtones of the shear wave. Further, the thickness of the substrate 20 should not be very close to one wave-length of the shear wave imparted into the substrate. This is because, when the ratio of the substrate thickness to the shear wavelength is approximately one, a practical array of reflective elements i.e. one that has a finite number of elements, cannot reject spurious lamb waves. This is because at a ratio of approximately one, the phase velocity of the first order symmetric lamb wave is approximately equal to that of the Zohps mode and the array cannot discriminate between the Zohps wave and that spurious lamb wave. Therefore, the preferred thickness of the substrate 20 is less than 0.9 times the shear wavelength or greater 1.1 times the wavelength but less than two times the wavelength.

In order to provide a touch panel that is greater than two times the wavelength of the shear wave imparted into the substrate, the substrate 20 is bonded to the backplate 32 such that there is no substantial absorption or coupling of the Zohps wave by the adhesive A suitable non-shear wave coupling adhesive that may be used to bond the substrate 20 to the backplate is a silicone rubber adhesive. This type of adhesive may be clear which can be important for various applications. The adhesive further remains liquid-like after curing.

In order to constrain the liquid-like adhesive 34 in a desired area of the acoustic wave touch panel 10 and to allow the laminated touch panel 10 to be easily manufactured, an adhesive barrier material 30 is positioned between the back surface 36 of the substrate 10 and the top surface 38 of the backplate 32 in a pattern, such as the 3-sided pattern shown in FIG. 1, to form the sidewalls of a cavity with the substrate 20 and the backplate 32 forming the respective front wall and back wall of the cavity. The adhesive barrier material 30 is shown in top view in FIG. 1 through the top surface of the substrate 20; this is shown in cross section in FIG. 2 where the adhesive barrier material 30 is between layers 32 and 20, and can be seen through layer 20 as is discussed with regard to FIG. 1. In the preferred embodiment of the present invention, the adhesive barrier material 30 is disposed adjacent a respective inner edge 40 and 42 of each of the reflective arrays 22 and 26 and along an outer edge of the substrate 20, for example the edge 28, so as to constrain the liquid-like adhesive 34 into an area of the touch panel that underlies the touch region 24 of the panel 10. More importantly, this arrangement of the adhesive barrier material 30 is such that the adhesive 34 is constrained so that it does not underlie the elements of either of the reflective arrays 22 or 26. Because the adhesive bonding material 34 does not underlie the reflective arrays 22 and 26, the adhesive 34 does not contribute to any acoustic wave loss in the reflective arrays. It is noted, however, that in accordance with the present invention, the barrier material can be positioned adjacent an outer edge 44 and 46 of the respective reflective arrays 22 and 26 so that the adhesive does underlie the reflective arrays when acoustic wave loss in the arrays due to the adhesive material 34 is not a concern. Such may be the case, for example, in acoustic wave touch panels 10 that are small in size. Further, positioning the adhesive boundary material 30 adjacent to each of the edges 16, 18 and 28 of the acoustic wave touch panel may be desired when the reflective arrays 22 and 26 are replaced with discrete transducers arranged along the edges 16 and 18 of the substrate 20 as is known.

The barrier material 30, like the adhesive 34 as discussed above, should be such that there is no substantial absorption or coupling of the shear wave by the barrier material 30. It has been found that a suitable adhesive barrier material may be formed of tape such as Kapton tape manufactured by 3M, however other such barrier materials within the preview of the ordinary artisan are possible. One or more layers of the tape is applied, for example, to the top surface 38 of the backplate 32 along three sides of a rectangle to define the sides of the cavity where the sides have a height of approximately 0.01". Thereafter, the acoustic wave propagating substrate 20 is placed on top of the adhesive barrier material 30. Next, the liquid-like adhesive is injected into the cavity defined by the barrier material 30, substrate 20 and backplate 32 utilizing a needle or the like that is inserted into the opening along the edge 25 of the substrate between the substrate 20 and the backplate 32. After the adhesive material 34 is injected into the cavity, the edge 25 may be sealed with tape if desired, although this is not necessary. Thereafter, the panel is heat cured.

As discussed above, it is also possible to have a touch panel in which the substrate and the backing layer are dissimilar from the standpoint of acoustic wave propagation. To this end, it is possible to bond the substrate to the backplate or backing layer wherein the velocity at which an acoustic wave travels and the backing layer or backplate is greater than the velocity at which the acoustic wave travels in the substrate. In this latter embodiment, the adhesive material used in accordance with the present invention need not be a nonshear wave coupling adhesive, but in fact can enable coupling from the substrate into the adhesive material. This possibility enables a mechanical bond from an acoustic standpoint to be effected between the substrate 20 and the backplate or backing layer 32. It is of course possible however to use an adhesive material which cannot support shear waves even though one is using a substrate and a backing layer which are dissimilar from the standpoint of acoustic properties as described above. Finally, it is noted that the backplate of the present disclosure may be glass, plastic, metal or ceramic depending upon the embodiment, the backplate may be formed of the same or a different material than is the substrate as described above. Suitable adhesives, both for the case in which the adhesive cannot support shear waves and for the case in which the adhesive cannot support shear waves and for the case in which the adhesive can support shear waves are as described herein as well as in U.S. Pat. No. 5,243,148 as incorporated above. Other adhesive materials for accomplishing the bonding as described herein as are within the purview of the artisan of ordinary skill having had the benefit of the present disclosure are considered within the scope of the present invention.

In accordance with the present invention, the adhesive barrier material allows a laminated acoustic wave touch panel to be manufactured very easily. Further, the adhesive material that is used to bond the acoustic wave propagating substrate to the backplate is constrained by the adhesive barrier material into a desired area of the touch panel.

Since changes may be made in the above-described apparatus and method without departing from the scope of the present invention, it intended that the above description and the drawing be interpreted as illustrative and not in a limiting sense.

What is claimed and desired to be secured by Letters Patent is:

1. An acoustic wave touch panel comprising:
    a substrate capable of supporting an acoustic wave for propagation therein;
    a back plate;
    an adhesive barrier material positioned between said substrate and said back plate, said barrier material defining a cavity with at least three sides between said substrate and said back plate; and
    an adhesive disposed in said cavity between said substrate and said back plate, said adhesive laminating said substrate to said back plate.

2. An acoustic wave touch panel as recited in claim 1 wherein said substrate is capable of supporting a shear wave.

3. An acoustic wave touch panel as recited in claim 2 wherein said shear wave is a zeroth order horizontally polarized shear wave.

4. An acoustic wave touch panel as recited in claim 1 wherein at least one side of said barrier material is positioned adjacent an edge of said substrate.

5. An acoustic wave touch panel as recited in claim 1 wherein said substrate includes an array of reflective elements for reflecting portions of said acoustic wave across a touch region of said substrate and at least one side of said barrier material is adjacent said array.

6. An acoustic wave touch panel as recited in claim 5 wherein said one side of said barrier material is adjacent to both said array and said touch region.

7. An acoustic wave touch panel as recited in claim 1 wherein said barrier material is formed of tape.

8. An acoustic wave touch panel as recited in claim 1 wherein said barrier material is formed of silicone rubber.

9. An acoustic wave touch panel as recited in claim 1 wherein said adhesive cannot support shear waves.

10. An acoustic wave touch panel as recited in claim 9 wherein said acoustic wave has a velocity in said substrate which is less than the velocity of said acoustic wave in said backplate.

11. An acoustic wave touch panel as recited in claim 9 in which said acoustic wave has a velocity in said substrate which is substantially identical to the velocity of said acoustic wave in said backplate.

12. An acoustic wave touch panel as recited in claim 1 wherein said adhesive does not form a mechanical bond between said substrate and said backplate.

13. An acoustic wave touch panel as recited in claim 1 wherein said adhesive supports a shear wave.

14. A acoustic wave touch panel as recited in claim 13 wherein said acoustic wave has a velocity in said substrate which is less than the velocity of said acoustic wave in said backplate.

15. An acoustic wave touch panel, comprising:
    a substrate capable of supporting an acoustic wave for propagation therein, said acoustic wave having a first velocity for a given frequency in said substrate;
    a backplate, said backplate capable of supporting an acoustic wave having a second velocity for said given frequency, said second velocity being greater than said first velocity;
    an adhesive barrier material positioned between said substrate and said backplate, said barrier material defining a cavity with at least three sides between said substrate and said back plate; and an adhesive disposed in said cavity between said substrate and said back plate, said adhesive laminating said substrate to said back plate.

16. An acoustic wave touch panel as recited in claim 15 wherein said adhesive forms a mechanical bond between said substrate and said backplate.

17. An acoustic wave touch as recited in claim 15 wherein said adhesive cannot support shear waves.

18. An acoustic wave touch panel as recited in claim 15 wherein said substrate is capable of supporting a shear wave.

19. An acoustic wave touch panel as recited in claim 18 wherein said shear wave is a zeroth order horizontally polarized shear wave.

20. An acoustic wave touch panel as recited in claim 15 wherein at least one side of said barrier material is positioned adjacent an edge of said substrate.

21. An acoustic wave touch panel as recited in claim 15 wherein said substrate includes an array of reflective elements for reflecting portions of said acoustic wave across a touch region of said substrate and at least one side of said barrier material is adjacent said array.

22. An acoustic wave touch panel as recited in claim 21 wherein said one side of said barrier material is adjacent to both said array and said touch region.

* * * * *